United States Patent [19]

De Lorenzo Poz

[11] Patent Number: 4,780,928
[45] Date of Patent: Nov. 1, 1988

[54] SPRING BIASED HINGE FOR SPECTACLE FRAMES

[75] Inventor: Mario De Lorenzo Poz, Candide, Italy

[73] Assignee: POZ S.n.c. di De Lorenzo Poz Mario ed Italo, Italy

[21] Appl. No.: 913,300

[22] Filed: Sep. 30, 1986

[30] Foreign Application Priority Data

Oct. 2, 1985 [IT] Italy .................................. 53881/85[U]

[51] Int. Cl.$^4$ ................................................ G02C 5/22
[52] U.S. Cl. ......................................... 16/228; 16/257; 16/267; 16/296; 351/153
[58] Field of Search ................. 16/228, 257, 259, 267, 16/291, 296, 335, 341; 351/113, 153

[56] References Cited

U.S. PATENT DOCUMENTS

| 312,766 | 2/1885 | Schott | 16/296 |
| 1,062,593 | 5/1913 | Isidor | 16/335 |
| 2,497,337 | 2/1950 | Ackerman | 16/259 |
| 2,671,379 | 3/1954 | Eloranta | 16/228 X |
| 3,102,156 | 8/1963 | O'Dea | 16/335 X |

FOREIGN PATENT DOCUMENTS

| 637323 | 3/1962 | Italy | 351/113 |
| 916371 | 1/1963 | United Kingdom | 16/259 |

Primary Examiner—Fred A. Silverberg
Attorney, Agent, or Firm—Sughrue, Mion, Zinn, Macpeak, and Seas

[57] ABSTRACT

A spectacle frame hinge in which, during folding of the leg against the face-piece, the leg is thrust towards the folded position against the inside of the face-piece.

7 Claims, 2 Drawing Sheets

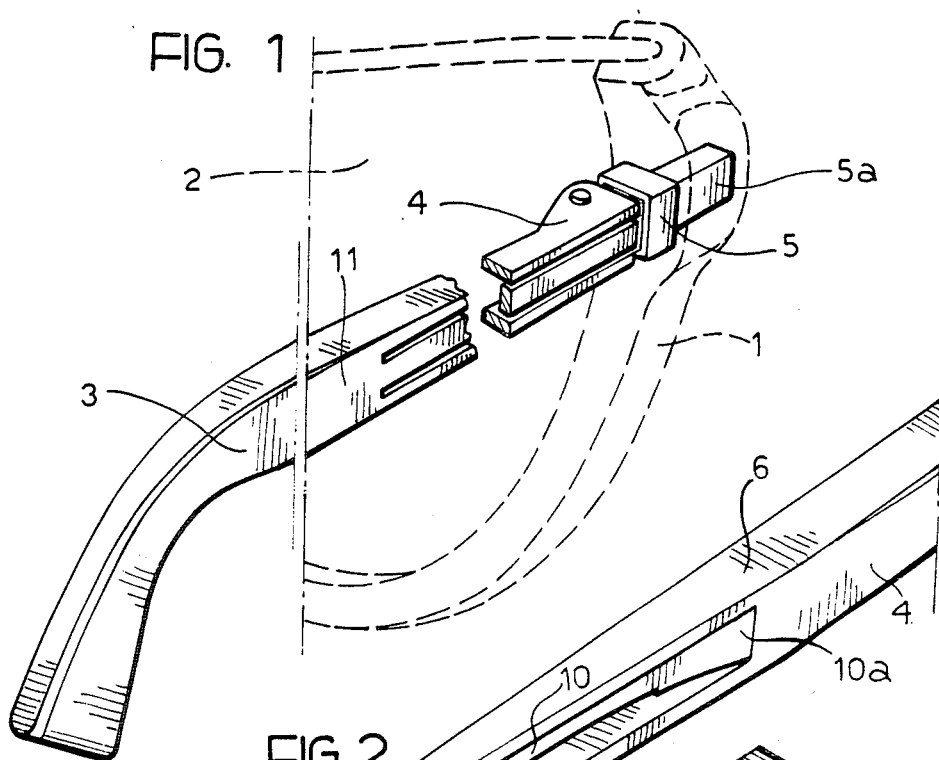
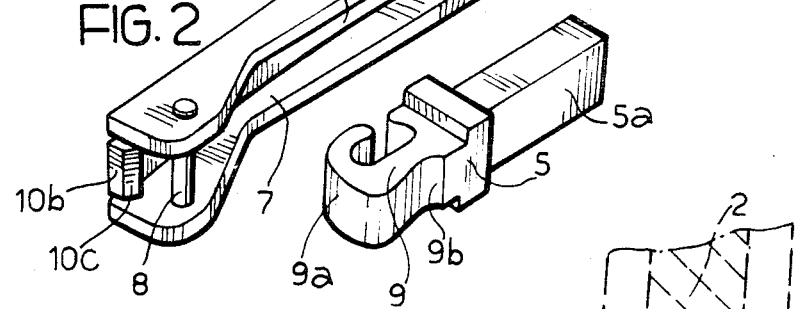
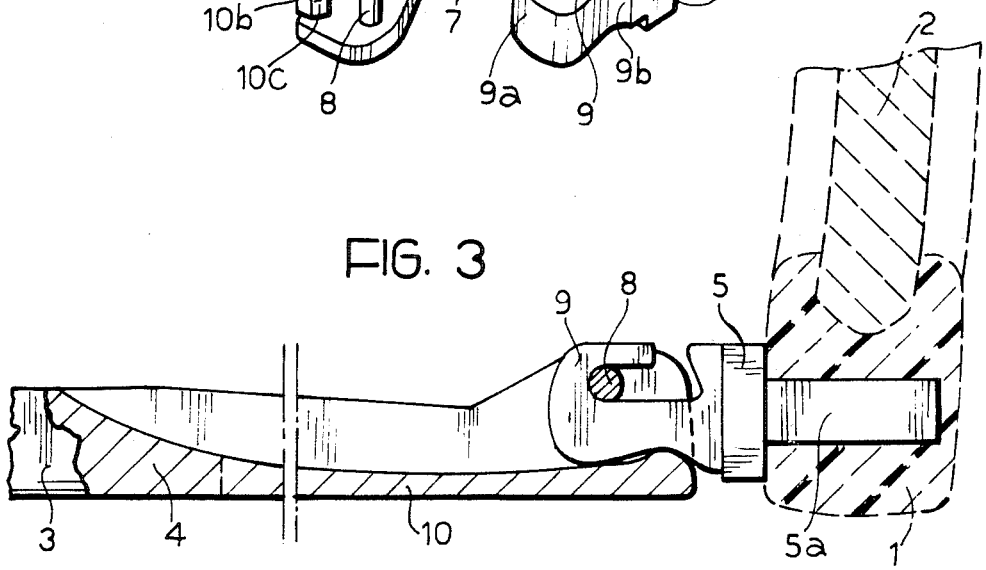

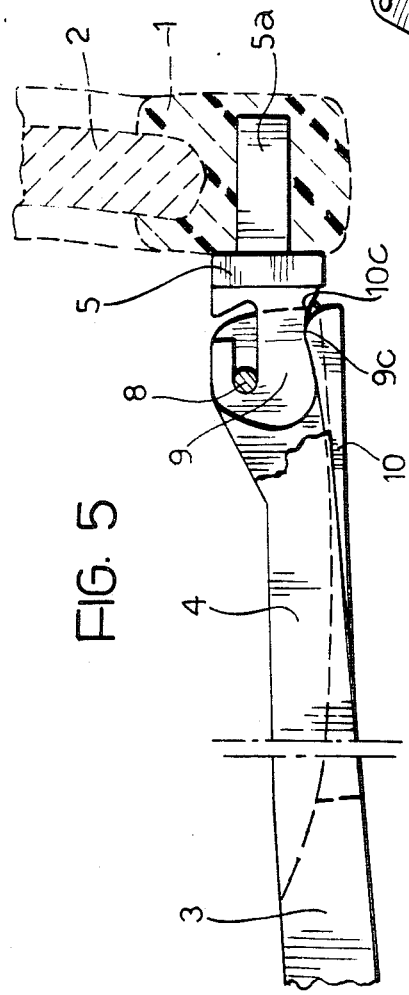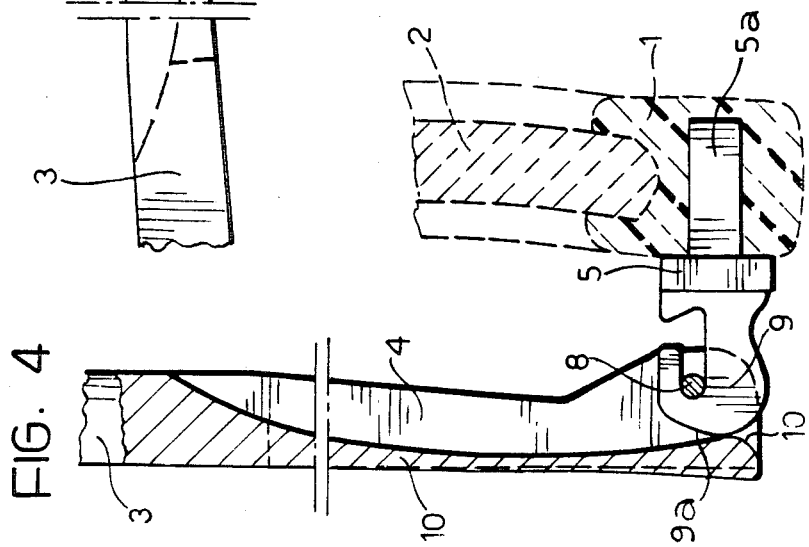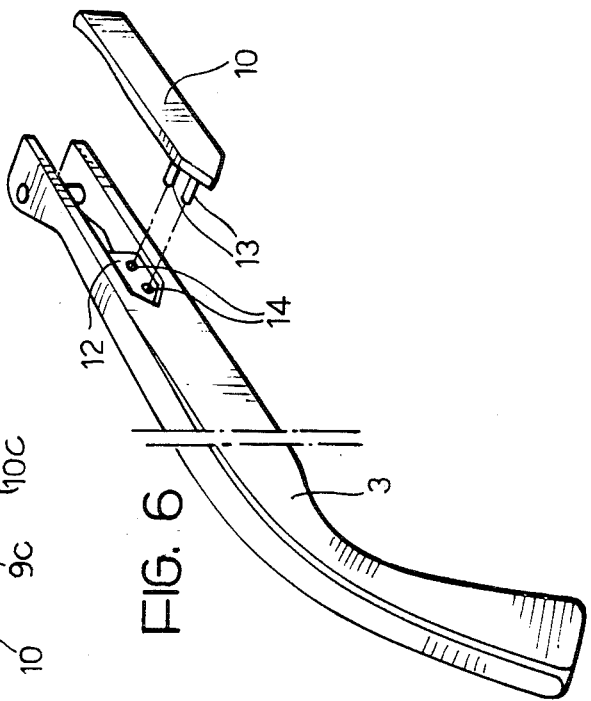

SPRING BIASED HINGE FOR SPECTACLE FRAMES

The present invention relates to hinges for spectacle frames, for connecting the face-piece to each of the legs of the frame.

An object of the present invention is to provide a resilient hinge in which, during folding of the leg against the face-piece, the leg is thrust naturally towards the folded position against the inside of the face-piece.

Another object of the invention is to provide a hinge for spectacle frames in which the legs can be opened out without breaking and in any case tend to return naturally to the open position in which they are perpendicular to the face-piece.

These objects are achieved according to the invention by a hinge for spectacle frames, characterised in that it comprises:

a first hinge member connected to the leg and having two parallel space-apart plates between which a pin which defining the hinge axis is mounted, and a second hinge member joined to the face-piece of the frame and having a hook which receives the pin within its aperture, in which:

the first hinge member also includes an elongate blade which is flexurally resiliently deformable, extending between the two plates in a plane perpendicular thereto and having one end joined to the first member and its opposite end facing the pin (8) of the hinge, and in which:

the hook of the second member has an outer surface which cooperates with the blade, and includes a first cam portion for cooperating with the blade during folding of the leg against the face-piece so as to bias the leg into the folded position when the leg rotates about the hinge beyond the maximum point of curvature of the cam profile.

A further characteristic of the hinge according to the invention lies in the fact that the outer surface of the hook of the second member further includes a second flat inclined portion for cooperating with the blade to deform it when the leg is opened relative to its position of use in which it is perpendicular to the face-piece, so as to bring the leg into the said position of use.

According to another characteristic of the invention, the first cam portion is also arranged to cooperate with the blade during opening of the leg, so as to urge the leg into the open position when the leg has rotated about the hinge beyond the point of maximum curvature of the cam profile.

Further characteristics and advantages of the present invention will become apparent from the description which follows with reference to the appended drawings, provided purely by way of non-limiting example, in which:

FIG. 1 is a partial perspective view of a pair of spectacles with metal legs having a hinge according to the present invention, FIG. 2 is an exploded perspective view of the hinge of the invention, FIG. 3 is a partially-sectioned plan view of the hinge of the invention in the position of use of the spectacles, FIG. 4 is a partially-sectioned plan view of the hinge of the invention during folding of the leg against the face-piece, FIG. 5 is a partially-sectioned plan view of the hinge of the invention in which the leg is opened out, and FIG. 6 is an exploded perspective view of a plastics leg having part of the hinge of the invention.

With reference to FIG. 1, the face-piece of a spectacle frame is indicated 1 and houses a pair of lenses 2 (only one of which is partially illustrated in the drawing).

The first hinge member 4 is formed integrally with the leg 3 from metal. The second hinge member 5, also of metal, has a root portion 5a by which it is fixed to the face-piece 1. The fixing may be carried out in any known manner; in the example of FIG. 1, the root portion 5a is embedded in the plastics structure of the face-piece.

The structure of the hinge is illustrated in the mounted condition in FIG. 2.

The first hinge member 4, which is adapted for connection to the leg, carries two parallel, spaced-apart plates 6, 7 between which a pin 8 defining the hinge axis is mounted. An elongate blade 10, which is flexurally resiliently deformable, is located between the two plates and is perpendicular thereto. In the embodiment illustrated in FIG. 2, in which the member 4 of the hinge is formed integrally with the metal leg 3, the blade is blanked directly from a side wall 11 (visible in FIG. 1) of the body 4 of the first hinge member. The blade 10 thus has one end 10a joined to the hinge member 4 so as to constitute the fixture of the blade, while its opposite end 10b is free and carries a tooth 10c with a cylindrical outer surface.

The second hinge member 5, which is intended to be joined to the face-piece of the spectacle frame by means of the root 5a, has a hook 9 which receives the pin 8 of the first hinge member 4 in its aperture when the hinge is assembled. This hook 9 has an outer surface with a profile constituted by a first cam portion 9a and a second flat inclined portion 9b, both intended to cooperate with the tooth 10c of the blade 10 in the manner explained below. The two members 4, 5 of the hinge are assembled by engagement of the hook 9 of the member 5 on the pin 8 of the member 6; the assembly is made possible by the resilience of the blade 10 which yields slightly to allow the pin 8 to engage the aperture of the hook 9.

Once assembled, the blade 10 acts to hold the pin and hook in assembled relation by biasing the pin into engagement with the hook.

In the assembled condition, the tooth 10c with the cylindrical outer surface cooperates with the outer surface of the hook 9 during its rotation about the pin 8. More particularly, the first cam portion 9a is arranged to cooperate with the blade 10 during folding of the leg 3 against the face-piece so as to urge the leg into its folded position when, during rotation of the leg about the hinge, the leg passes beyond the point of maximum curvature of the cam profile 9a. The second flat inclined portion 9b, however, is arranged to cooperate with the blade 10 so as to deform it when the leg is opened relative to its position of use in which it is perpendicular to the face-piece, so as to bias the leg into the said position of use.

The various operating conditions of the hinge of the invention are shown in FIGS. 3, 4 and 5, to which reference is made below.

In FIG. 3, the spectacle frame is in its usual condition of use in which, that is, the face-piece 1 housing a pair of lenses 2 is perpendicular to the leg 3. The hinge member 5 joined to the face-piece 1 is engaged on the pin 8 of the hinge member 4 by means of the hook 9. In this condition, the blade 10 of the member 4 is not stressed in any way but simply cooperates with the pin 8 to keep the hook 9 hinged on the member 4.

FIG. 4 illustrates an intermediate position in which the leg 3 is located during its folding movement against the face-piece 1. In this phase, the tooth 10c of the blade 10 cooperates with the cam surface 9a of the hook 9. Thus, the blade is flexed outwardly. When, during the folding of the leg 3 towards the face-piece 1, the tooth 10c passes beyond the point of maximum curvature of the cam portion 9a in its sliding on the outer surface of the hook 9, the particular conformation of this cam portion 9a, by its cooperation with the inner surface of the blade 10 and particularly with the surface of the tooth 10c, tends to bring the leg 3 against the inner face of the face-piece 1. Thus, the advantage is achieved that the legs tend to be brought naturally against the inner face of the face-piece when they are folded, and are held in this position.

In FIG. 5, the leg 3 is illustrated in a position in which it is opened beyond the normal open position of use. In this situation, the surface of the tooth 10c of the blade 10 slides on the flat inclined surface 9b of the hook 9. The resilient blade 10 yields by bending outwardly and biasses the leg 3 back towards its normal position perpendicular to the face-piece 1. Thus, the advantage is obtained that the legs may be opened out without breaking, and at the same time tend to return to the position of use in which they press against the temples of the user and thus keep the frame firmly in place on the face.

Whenever the leg of the frame is of plastics material, as illustrated in FIG. 6, the resilient blade 10, which may still be of metal, is fixed to the leg 3 in correspondence with a rebated surface 12 by insertion of pins 13 of the blade 10 in corresponding holes 14 in the leg 3.

Naturally, the scope of the present invention extends to models which achieve equal utility by using the same innovative concept.

I claim:

1. In a spectacle frame comprising a face-piece and two legs, a hinge for connecting the face-piece to a respective leg, wherein the hinge comprises:
   a first hinge member connected to the leg and having two parallel spaced-apart plates between which a pin defining the hinge axis is mounted, and
   a second hinge member joined to the face-piece of the frame and having a hook which receives the pin within its aperture,
   and wherein:
   the first hinge member also includes an elongate blade which is flexurally resiliently deformable, the blade extending between the two plates in a plane perpendicular thereto and having one end jointed to the first hinge member and its opposite end facing the pin of the hinge,
   the hook of the second member has an outer surface which cooperates with the blade and includes a first cam portion for cooperating with the blade during folding of the leg against the face-piece so as to bias the leg into the folded position when the leg rotates about the hinge beyond the maximum point of curvature of the cam profile and to bias the pin into engagement with the hook to hold the pin and hook in assembled relation.

2. A hinge according to claim 1, wherein the outer surface of the hook of the second member further includes a second flat inclined portion for cooperating with the blade to deform it when the leg is opened relative to its position of use in which it is perpendicular to the face-piece, so as to bring the leg into the said position of use.

3. A hinge according to claim 2 wherein the blade has a tooth with a cylindrical outer surface at its end facing the hinge pin, said tooth projecting towards the pin and constituting a surface of the blade which effectively cooperates with the cam and the flat inclined surface of the hook.

4. A hinge according to claims 1, wherein the first cam portion is also arranged to cooperate with the blade during opening of the leg, so as to urge the leg into the open position when the leg has rotated about the hinge beyond the point of maximum curvature of the cam profile.

5. A hinge according to claim 1, wherein the first hinge member includes a wall which joins the two plates and to which the blade is connected.

6. A hinge according to claim 5, wherein the blade is formed integrally with the first hinge member by blanking from said wall.

7. A hinge according to claim 5, wherein the blade is a separate member from the first hinge member and is fixed to said wall.

* * * * *